US011455246B2

(12) United States Patent
Fu

(10) Patent No.: US 11,455,246 B2
(45) Date of Patent: Sep. 27, 2022

(54) GARBAGE COLLECTION METHOD FOR DATA STORAGE DEVICE

(71) Applicant: Silicon Motion, Inc., Jhubei (TW)

(72) Inventor: Hsueh-Chun Fu, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 17/031,931

(22) Filed: Sep. 25, 2020

(65) Prior Publication Data

US 2021/0216447 A1    Jul. 15, 2021

(30) Foreign Application Priority Data

Jan. 13, 2020    (TW) .................................. 109101110

(51) Int. Cl.
*G06F 12/02*    (2006.01)
*G06F 12/0817*    (2016.01)

(52) U.S. Cl.
CPC ...... *G06F 12/0253* (2013.01); *G06F 12/0246* (2013.01); *G06F 12/0822* (2013.01); *G06F 2212/7201* (2013.01); *G06F 2212/7209* (2013.01)

(58) Field of Classification Search
CPC ............. G06F 12/0253; G06F 12/0246; G06F 12/0822; G06F 2212/7209; G06F 2212/7201

See application file for complete search history.

(56) References Cited

U.S. PATENT DOCUMENTS

| | | | |
|---|---|---|---|
| 2011/0047347 A1* | 2/2011 | Li | G06F 3/064 |
| | | | 711/209 |
| 2016/0239380 A1 | 8/2016 | Wideman et al. | |
| 2017/0132125 A1* | 5/2017 | Cai | G06F 11/10 |
| 2017/0168951 A1* | 6/2017 | Kanno | G06F 3/0679 |
| 2017/0286288 A1* | 10/2017 | Higgins | G06F 11/1048 |
| 2019/0012080 A1* | 1/2019 | Chen | G06F 3/0652 |
| 2019/0065366 A1* | 2/2019 | Muchherla | G06F 3/0688 |
| 2019/0227926 A1 | 7/2019 | Ke | |
| 2020/0012597 A1* | 1/2020 | Na | G06F 3/0688 |

FOREIGN PATENT DOCUMENTS

| | | |
|---|---|---|
| TW | 201413450 A | 4/2014 |
| TW | 201527973 A | 7/2015 |

* cited by examiner

*Primary Examiner* — Tasnima Matin

(57) ABSTRACT

A garbage collection method is provided and applied to a data storage device. The garbage collection method includes the following steps: selecting source blocks from data blocks, wherein a total number of valid data of the source blocks is larger than or equal to a predetermined data number of a block; copying valid data of a part of the source blocks into a destination block, wherein a total number of the valid data of the part of the source blocks is smaller than the predetermined data number; copying all or a part of valid data of remaining source blocks into the destination block; updating a logical to physical addresses mapping table based on a mapping information of the destination block; and recovering all or a part of the source blocks as spare blocks.

16 Claims, 4 Drawing Sheets

GARBAGE COLLECTION METHOD FOR DATA STORAGE DEVICE

FIELD OF THE INVENTION

The present invention relates to a technique for data storage, and more particularly to a garbage collection method for a data storage device.

BACKGROUND OF THE INVENTION

A data storage device, in particular a data storage device using a non-volatile storage medium, includes data blocks. Each data block includes data pages, each data page is used to store data with at least one storage unit, and the storage unit may be 512 B (byte) or preferably 4 KB. The data blocks are also divided to empty data blocks (or spare data blocks) and non-empty data blocks (or in-use data blocks) depending on whether data is stored therein or not. For data management and access, the data storage device needs to establish and store a Host logical-to-Flash physical address mapping table mapping table, which is simply referred to as a logical to physical addresses mapping table or a L2P mapping table in the present invention. When the data storage device is in operation, the L2F mapping table is copied to a dynamic random access memory (DRAM) to increase an efficiency of data management and access. In addition, depending on a size of recorded content, a general size of the mapping table is 1/1000 of the data storage capacity of the data storage device. For example, if a size of a data storage device is 256 GB, a size of a corresponding mapping table is 256 MB. Therefore, in order to store an entire L2P mapping table and system data, parameters, or programs required for an operation of the data storage device, a size of the DRAM is preferably greater than or equal to 256 MB.

For a data storage device that is not provided with a DRAM or only provided with a small-sized DRAM (i.e., the DRAM is not large enough to store an entire mapping table), the entire L2P mapping table is divided to sub-L2P mapping tables, and these sub-L2P mapping tables are often exchanged into a small DRAM for a garbage collection. When collecting valid data of source blocks, it will load sequentially the sub-L2P mapping table of the source blocks from the non-volatile storage medium into the controller inside, and check whether valid data of each source block are still on this sub-L2P mapping table in this garbage collection. This method of checking all source blocks is to reduce the frequent exchange of these sub-L2P mapping tables. If other source blocks have the same sub-L2P mapping table, the sub-L2P mapping table is not reloaded into the controller inside. However, when selecting the source blocks, the valid data of the source blocks will be filled or exceeded a destination block as much as possible. When a total number of valid data of the selected source blocks exceeds a capacity of the destination block, it may occur after the end of the garbage collection, there is no guarantee that the source blocks can be released into spare blocks, so there is a technical demand.

SUMMARY OF THE INVENTION

The object of the present invention is to provide a garbage collection method for a data storage device, which can ensure that a destination block can be effectively used, and that source blocks are released to become spare blocks.

Embodiments of the present invention provide a garbage collection method which is applied to a data storage device. The garbage collection method includes: selecting source blocks from data blocks, wherein a total number of valid data of the source blocks is larger than or equal to a predetermined data number of a block; copying valid data of a part of the source blocks into a destination block, wherein a total number of the valid data of the part of the source blocks is smaller than the predetermined data number; copying all or a part of valid data of remaining source blocks into the destination block, wherein a data number of the copied valid data is equal to the total number of the valid data of the part of the source blocks minus the predetermined data number; updating a logical to physical addresses mapping table based on a mapping information of the destination block; and recovering all or a part of the source blocks as spare blocks.

The embodiments of the present invention provide a data storage device includes: a control unit which is configured to execute a garbage collection method. The garbage collection method includes: selecting source blocks from data blocks, wherein a total number of valid data of the source blocks is larger than or equal to a predetermined data number of a block; copying valid data of a part of the source blocks into a destination block, wherein a total number of the valid data of the part of the source blocks is smaller than the predetermined data number; copying all or a part of valid data of remaining source blocks into the destination block, wherein a data number of the copied valid data is equal to the total number of the valid data of the part of the source blocks minus the predetermined data number; updating a logical to physical addresses mapping table based on a mapping information of the destination block; and recovering all or a part of the source blocks as spare blocks.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Hereinafter, the present invention will be described in detail with drawings illustrating various embodiments of the present invention. However, the concept of the present invention may be embodied in many different forms and should not be construed as limitative of the exemplary embodiments set forth herein. In addition, the same reference number in the figures can be used to represent the similar elements.

Figure 1:
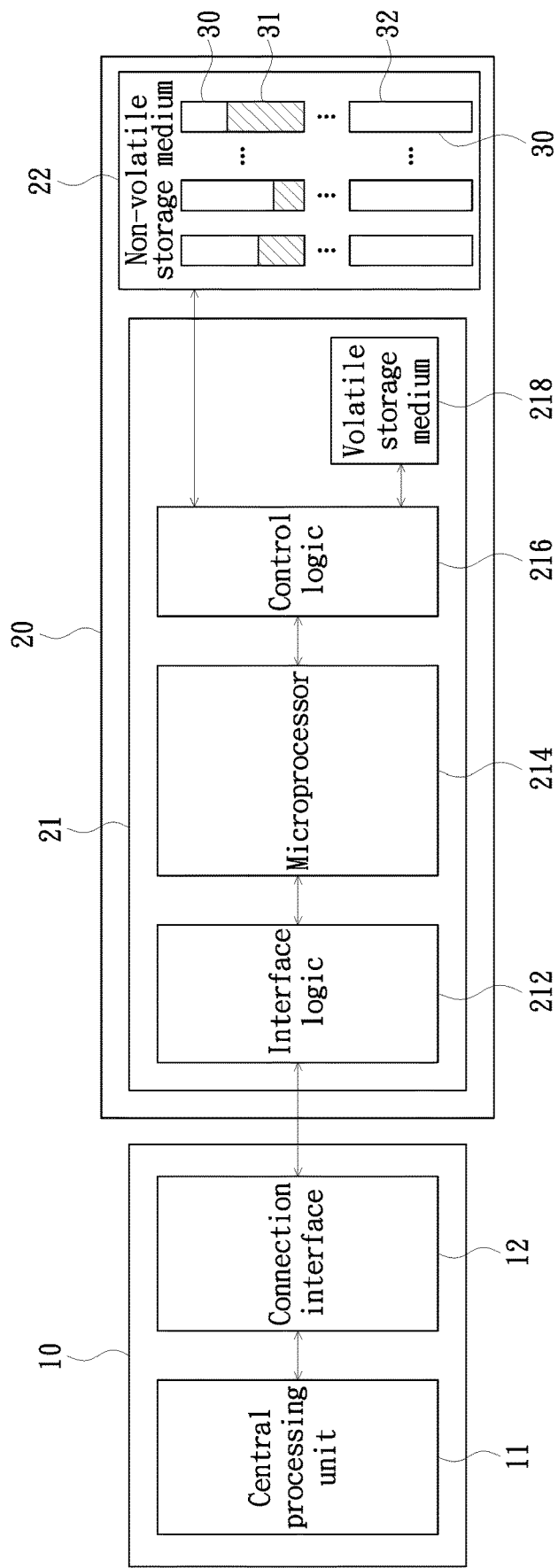
FIG. 1 is a schematic diagram of a data storage device provided by an embodiment of the present invention and its electrical coupling relationship with a host.

FIG. 1 is a schematic diagram of a data storage device provided by an embodiment of the present invention and its electrical coupling relationship with a host. As shown in FIG. 1, a host 10 mainly includes a central processing unit 11 and a connection interface 12. The connection interface 12 is adapted to be electrically coupled to a data storage device 20. The central processing unit 11 is used to transmit commands and data to the data storage device 20 through the connection interface 12, for example, to transmit read commands to the data storage device 20, or to transmit write commands and data to be written to the data storage device 20. In this embodiment, the host 10 is implemented by a computer, a mobile phone, a tablet, a camera, or other handheld electronic devices with computing functions.

The data storage device 20 includes a control unit 21 and a non-volatile storage medium 22. The control unit 21 is electrically coupled to the non-volatile storage medium 22 and is used to control operations (for example, data accession and erasion) of the non-volatile storage medium 22. In this embodiment, the non-volatile storage medium 22 is a memory device with long-time data storage, such as a flash memory, a magnetoresistive random access memory (Magnetoresistive RAM), a ferroelectric random access memory (Ferroelectric RAM), or a resistive Memory (RRAM). The non-volatile storage medium 22 has physical blocks (referred to as blocks) 30, and each block 30 has data pages, and the data pages are used to store data. Block 30 may be called differently according to its function. For example: the block 30 into which valid data are being written is called an active block, the block 30 which the valid data have been stored is called a data block 31, and the block 30 without valid data is called a spare block 32. In addition, the data block 31 can be recovered as a spare block 32.

The control unit 21 mainly includes an interface logic 212, a microprocessor 214, a control logic 216, and a volatile storage medium 218. The volatile storage medium 218 is implemented by, for example, a static random access memory (SRAM). The microprocessor 214 of the control unit 21 is electrically coupled to the interface logic 212 and the control logic 214, and the control logic 214 is electrically coupled to the non-volatile storage medium 22 and the volatile storage medium 218. The microprocessor 214 is used to access the data in the non-volatile storage medium 22 and the volatile storage medium 218 through the control logic 216, and the microprocessor 214 is also used to receive commands or data from the host 10 through the interface logic 212. The command is, for example, a write command, a read command, or a flush command.

The data storage device 20 may further include a DRAM, which is mainly used to temporarily store a logical to physical addresses mapping table (L2P) mapping table. A size of the L2P mapping table is, for example, 512 MB and a size of the DRAM is 512 MB. In another embodiment, the data storage device 20 may only include a DRAM and a size of the DRAM is 128 MB. This DRAM may be used to temporarily store a part of the L2P mapping table.

In the following description, the garbage collection method for the data storage device of the present invention will be described by taking the data storage device 20 without DRAM as an example. However, the garbage collection method for the data storage device of the present invention can also be applied to data storage configured with a DRAM. Thus, it is not limited thereto.

Figure 2:
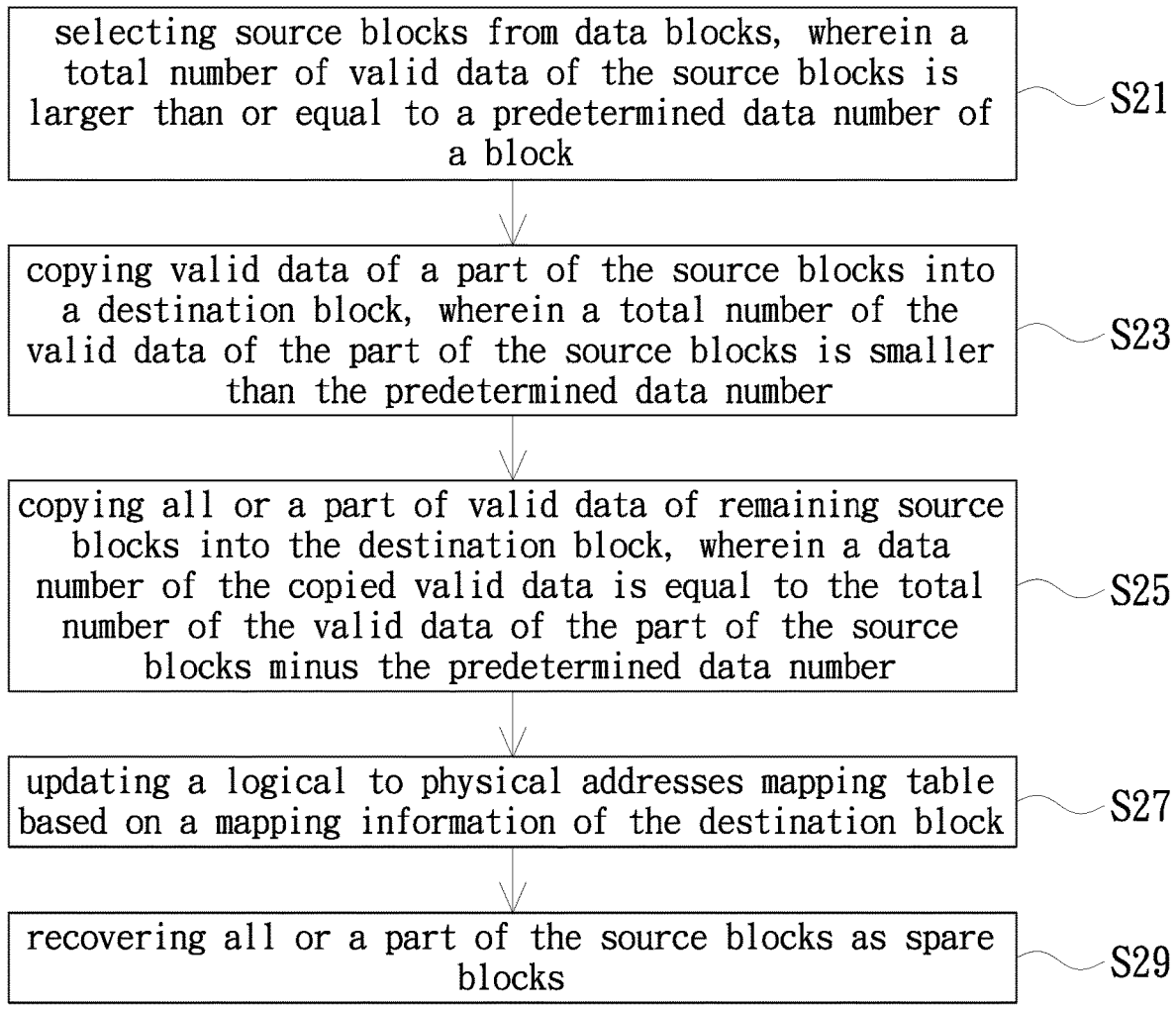
FIG. 2 is a flowchart of a garbage collection method provided by an embodiment of the present invention.

FIG. 2 is a flowchart of a garbage collection method provided by an embodiment of the present invention. Please refer to FIG. 1, FIG. 2, FIG. 3A, FIG. 3B, and FIG. 3C at the same time. There are many conditions that trigger the garbage collection method of the present invention. For example, a total number of spare blocks 32 is less than or equal to a garbage collection (GC) threshold, the host 10 does not issue any commands within a preset time period, and the host 10 commands the data storage device 20 to enter a standby mode or a power saving mode. When one of the above conditions is satisfied, the control unit 21 executes the following steps.

Figure 3A:
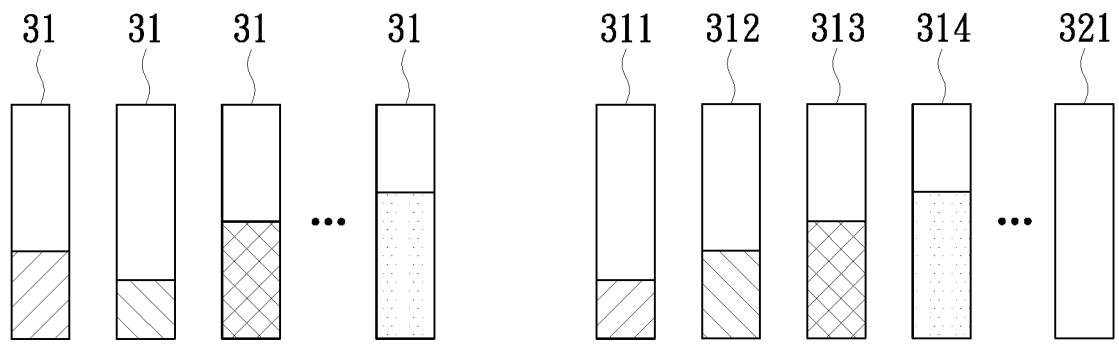
FIG. 3A is a schematic diagram of selecting source blocks from data blocks in a garbage collection method provided by an embodiment of the present invention.

In step S21, as shown in FIG. 3A, source blocks are selected from data blocks 31, where a total number of valid data of the source blocks is greater than or equal to a predetermined data number of a block 30, a number of the source blocks is at least three. The control unit 21 preferably selects the data blocks 31 having a smaller number of valid data as the source blocks. For example, four data blocks 31 are selected as the source blocks 311 to 314, and the source blocks 311 to 314 have valid data of 400, 450, 550, and 1000, respectively. Block 30 has, for example, 512 data pages, and each data page can store 4 pieces of 4 KB data, that is, the predetermined data number is 2048 (i.e., 2048 pieces of 4 KB data). In addition, preferably, the control unit 21 updates immediately a number of valid data of each data block 31, and records the number of valid data of each data block 31 into a system information block.

Figure 3B:
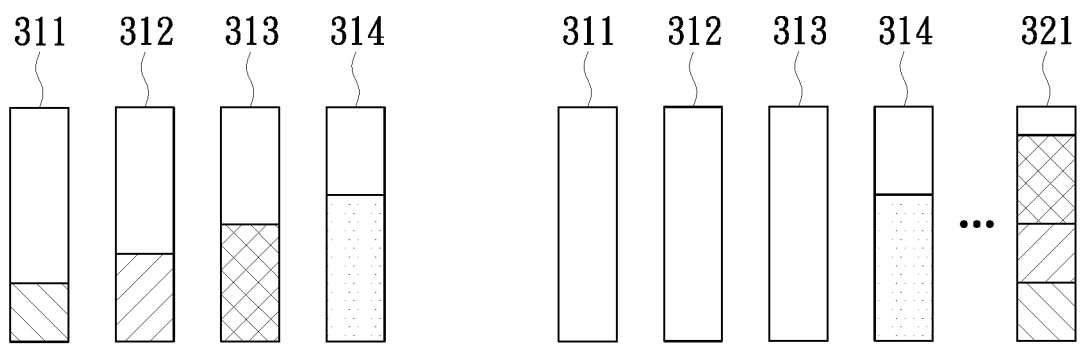
FIG. 3B is a schematic diagram of copying valid data of a part of source blocks into a destination block in a garbage collection method provided by an embodiment of the present invention.

In step S23, as shown in FIG. 3B, valid data of a part of the source blocks 311 to 313 are copied into a destination block 321. A total number of the valid data of the part of the source blocks 311 to 313 is less than the predetermined data number. A number of the part of the source blocks 311 to 313 is at least 2. A number of remaining source blocks 314 is equal to one. For example, the control unit 21 selects the source blocks 311 to 313, the total number of valid data is 1350, which is less than 2048. The control unit 21 copies the valid data of the source blocks 311 to 313 to the destination block 321. In addition, the destination block 321 is selected from spare blocks 32, and the destination block 321 is randomly or sequentially selected from the spare blocks 32, or is the spare block 32 having a minimum erasing count.

In step S25, all or a part of valid data of the remaining source block 314 are copied to the destination block 321. A data number of the copied valid data is equal to the total number of the valid data of the source blocks 311 to 313 minus the predetermined data number, i.e., 2048 minus 1350 is equal to 698. Therefore, the control unit 21 copies 698 valid data of the source block 314 to the destination block 321. After the copying is completed, the source block 314 still has 302 valid data that has not been copied.

In another embodiment, the source blocks 311 to 314 have valid data of 400, 450, 500, and 698, respectively. The control unit 21 copies 698 valid data from the source block 314 to the destination block 321. After the copying is completed, all valid data of the source block 314 has been copied.

In step S27, a logical to physical addresses mapping table is updated based on a mapping information of the destination block 321. Since the destination block 321 is full of data, the control unit 21 closes the destination block 321, that is, the control unit 21 writes "End of Block" information into the destination block 321. In addition, the control unit 21 updates the content of the L2P mapping table based on the mapping information (i.e., the physical address) of the data stored in the destination block 321. In addition, since the data storage device 20 is not configured with a DRAM, the control unit 21 may temporarily store a part of the L2P mapping table, such as a group mapping table in the L2P mapping table, to the SRAM, and updates the content of the group mapping table based on the mapping information related to the group mapping table in the destination block 321. After that, the control unit 21 loads another group mapping table into the SRAM, and repeats the above steps until all the mapping information of the destination block 321 has been updated to the L2P mapping table, or more than one group mapping table.

Figure 3C:
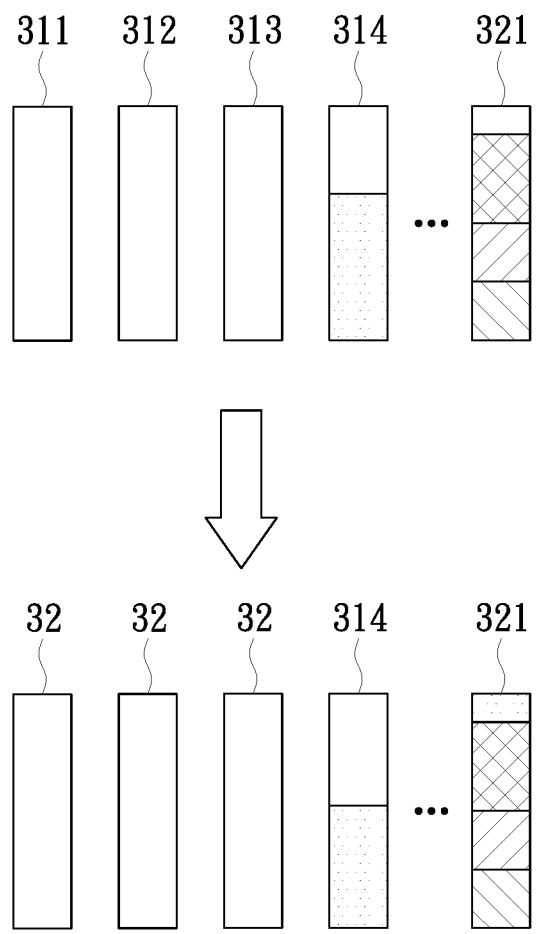
FIG. 3C is a schematic diagram of recovering all or a part of source blocks into spare blocks in a garbage collection method provided by an embodiment of the present invention.

In step S29, as shown in FIG. 3C, all or a part of the source blocks are recovered into spare blocks 32. Since the valid data of the source blocks 311 to 313 is copied to the destination block 321 and the mapping information of the L2P mapping table has pointed to the destination block 321, the valid data of the source blocks 311 to 313 is no longer valid. The control unit 21 can erase the source blocks 311 to 313 and recover the source blocks 311 to 313 as the spare block 32, or directly make the source blocks 311 to 313 as the spare blocks 32. In this way, a total number of the spare blocks 32 can be increased by 3.

In another embodiment, all the valid data of the source blocks 311 to 314 is copied to the destination block 321, and the mapping information of the L2P mapping table has pointed to the destination block 321, so the valid data of the source blocks 311 to 314 is no longer valid. The control unit 21 can erase the source blocks 311 to 314 and recover the source blocks 311 to 314 as the spare blocks 32, or directly make the source blocks 311 to 314 as the spare blocks 32. In this way, a total number of the spare blocks 32 can be increased by 4.

In another embodiment, the garbage collection method of the present invention can be executed in stages, and the control unit 21 executes the commands from the host 10 between each stage. In other words, the data storage device 20 executes the garbage collection method of the present invention and the commands from the host 10 by turns. In this way, the system performance of the data storage device 20 will not be significantly reduced.

In summary, the data storage device and the garbage collection method for a data storage device provided by the present invention can ensure that the destination block can be filled and effectively used, and that the source blocks are released to become the spare blocks.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A garbage collection method, applied to a data storage device, the garbage collection method comprising:
    selecting source blocks from data blocks, wherein a total amount of valid data of the source blocks is larger than or equal to a predetermined amount of data of a data block;
    copying valid data of a part of the source blocks into a destination block, wherein a total amount of the valid data of the part of the source blocks is smaller than the predetermined amount of data;
    copying all or a part of valid data of remaining source blocks into the destination block, wherein an amount of data of the copied valid data of the remaining source blocks is equal to the total amount of the valid data of the source blocks minus the predetermined amount of data;
    updating a logical to physical addresses mapping table based on a mapping information of the destination block; and
    recovering all or the part of the source blocks as spare blocks.

2. The garbage collection method as claimed in claim 1, wherein a number of the source blocks is at least three.

3. The garbage collection method as claimed in claim 1, wherein a number of the part of the source blocks is at least two.

4. The garbage collection method as claimed in claim 1, wherein a number of the remaining source blocks is equal to one.

5. The garbage collection method as claimed in claim 1, wherein the step of selecting source blocks from data blocks further includes: selecting data blocks having a smaller amount of valid data as the source blocks.

6. The garbage collection method as claimed in claim 1, wherein the step of selecting source blocks from data blocks further includes: updating immediately an amount of valid data of each data block, and recording the amount of valid data of each data block into a system data block of each data block.

7. The garbage collection method as claimed in claim 1, wherein the destination block is selected from spare data blocks.

8. The garbage collection method as claimed in claim 1, wherein the data storage device includes the data blocks storing valid data and spare data blocks not storing valid data.

9. A data storage device comprising:
    a control unit, configured to execute a garbage collection method, wherein the garbage collection method includes:
    selecting source blocks from data blocks, wherein a total amount of valid data of the source blocks is larger than or equal to a predetermined amount of data of a data block;
    copying valid data of a part of the source blocks into a destination block, wherein a total amount of the valid data of the part of the source blocks is smaller than the predetermined amount of data;
    copying all or a part of valid data of remaining source blocks into the destination block, wherein an amount of data of the copied valid data of the remaining source blocks is equal to the total amount of the valid data of the source blocks minus the predetermined amount of data;
    updating a logical to physical addresses mapping table based on a mapping information of the destination block; and
    recovering all or the part of the source blocks as spare blocks.

10. The data storage device as claimed in claim 9, wherein a number of the source blocks is at least three.

11. The data storage device as claimed in claim 9, wherein a number of the part of the source blocks is at least two.

12. The data storage device as claimed in claim 9, wherein a number of the remaining source blocks is equal to one.

13. The data storage device as claimed in claim 9, wherein the step of selecting source blocks from data blocks further includes: selecting data blocks having a smaller amount of valid data as the source blocks.

14. The data storage device as claimed in claim 9, wherein the step of selecting source blocks from data blocks further includes: updating immediately an amount of valid data of each data block, and recording the amount of valid data of each data block into a system data block of each data block.

15. The data storage device as claimed in claim 9, wherein the destination block is selected from spare data blocks.

16. The data storage device as claimed in claim 9, wherein the data storage device includes the data blocks storing valid data and spare data blocks not storing valid data.

\* \* \* \* \*